US011188558B2

(12) United States Patent
Borden et al.

(10) Patent No.: US 11,188,558 B2
(45) Date of Patent: Nov. 30, 2021

(54) PARENTING COMPUTED FIELDS WITH DATA OBJECTS

(71) Applicant: Tableau Software, LLC, Seattle, WA (US)

(72) Inventors: Nicolas Ratigan Borden, Seattle, WA (US); Christian Gabriel Eubank, Seattle, WA (US); Justin Faux Talbot, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 16/725,986

(22) Filed: Dec. 23, 2019

(65) Prior Publication Data

US 2021/0173849 A1 Jun. 10, 2021

Related U.S. Application Data

(60) Provisional application No. 62/944,977, filed on Dec. 6, 2019.

(51) Int. Cl.
*G06F 16/26* (2019.01)
*G06F 3/14* (2006.01)
*G06F 16/901* (2019.01)

(52) U.S. Cl.
CPC .............. *G06F 16/26* (2019.01); *G06F 3/14* (2013.01); *G06F 16/9024* (2019.01)

(58) Field of Classification Search
CPC ..................................... G06F 16/26; G06F 3/14
See application file for complete search history.

(56) References Cited

U.S. PATENT DOCUMENTS

| 9,383,913 | B2 | 7/2016 | Hoyer et al. |
| 9,489,119 | B1 | 11/2016 | Smith, Jr. |
| 10,705,695 | B1 | 7/2020 | Porath et al. |
| 10,783,162 | B1 * | 9/2020 | Montague ........... G06F 16/2465 |

(Continued)

FOREIGN PATENT DOCUMENTS

WO 2006060773 A2 6/2006

OTHER PUBLICATIONS

Office Communication for U.S. Appl. No. 16/984,014 dated Aug. 10, 2021, pp. 1-32.

(Continued)

*Primary Examiner* — Scott T Baderman
*Assistant Examiner* — Steve P Golden
(74) *Attorney, Agent, or Firm* — John W. Branch; Branch Partners PLLC

(57) ABSTRACT

Embodiments are directed to visualizing data. A computed field that includes input fields and an object model that includes objects may be provided. One or more of the objects may be determined based on the input fields such that each input field corresponds to a determined object. A sub-graph may be generated based on the determined objects. Zero or more determined objects may be pruned from the sub-graph based on a traversal of the sub-graph and characteristics of the determined objects such that each pruned object may be determined to be an attribute of at least one of the determined objects. In response to the iterative pruning providing one remaining determined object in the sub-graph, assigning the remaining determined object as a parent of the computed field.

16 Claims, 12 Drawing Sheets

(56) References Cited

U.S. PATENT DOCUMENTS

| | | |
|---|---|---|
| 2010/0235771 A1 | 9/2010 | Gregg, III |
| 2010/0313157 A1 | 12/2010 | Carlsson et al. |
| 2010/0318583 A1 | 12/2010 | Cohen |
| 2011/0219321 A1 | 9/2011 | Gonzalez Veron et al. |
| 2012/0311497 A1 | 12/2012 | Bear et al. |
| 2014/0026084 A1 | 1/2014 | Gilboa |
| 2014/0058789 A1 | 2/2014 | Doehring et al. |
| 2014/0215405 A1 | 7/2014 | Breedvelt-Schouten |
| 2015/0112998 A1 | 4/2015 | Shankar et al. |
| 2016/0224616 A1 | 8/2016 | Beacom et al. |
| 2016/0314605 A1 | 10/2016 | Filippi et al. |
| 2017/0010787 A1 | 1/2017 | Ranganathan et al. |
| 2017/0075557 A1 | 3/2017 | Noble et al. |
| 2017/0091317 A1 | 3/2017 | Cummings et al. |
| 2017/0102694 A1 | 4/2017 | Enver et al. |
| 2017/0103103 A1 | 4/2017 | Nixon et al. |
| 2017/0140068 A1 | 5/2017 | Oh et al. |
| 2017/0154088 A1 | 6/2017 | Sherman |
| 2017/0177681 A1 | 6/2017 | Potiagalov et al. |
| 2017/0177744 A1 | 6/2017 | Potiagalov et al. |
| 2017/0178368 A1 | 6/2017 | Noon et al. |
| 2017/0213131 A1 | 7/2017 | Hammond et al. |
| 2017/0220633 A1 | 8/2017 | Porath et al. |
| 2017/0286526 A1 | 10/2017 | Bar-Or et al. |
| 2018/0024731 A1 | 1/2018 | Sanches et al. |
| 2018/0218050 A1 | 8/2018 | Porath et al. |
| 2018/0260106 A1 | 9/2018 | Leonard et al. |
| 2019/0034489 A1 | 1/2019 | Ziegler |
| 2019/0095395 A1 | 3/2019 | Piecko |
| 2019/0294720 A1 | 9/2019 | Beringer et al. |
| 2019/0332599 A1 | 10/2019 | Woo |
| 2020/0104401 A1 | 4/2020 | Burnett et al. |
| 2020/0104402 A1 | 4/2020 | Burnett et al. |
| 2020/0372057 A1* | 11/2020 | Tonkin ............... G06N 5/025 |

OTHER PUBLICATIONS

Furmanova, Katarina et al., "Taggle: Scalable Visualization of Tabular Data through Aggregation," IEEE Transactions on Visualization and Computer Graphics, 2017, pp. 1-14.

Papenbrock, Thorsten et al., "Data-driven Schema Normalization," in Proceedings of the 20th International Conference on Extending Database Technology, 2017, pp. 342-353.

Brunel, Robert et al., "Supporting Hierarchical Data in SAP HANA," 2015 IEEE 31st International Conference on Data Engineering (ICDE), 2015, pp. 1-12.

Pienta, Robert et al., "VISAGE: Interactive Visual Graph Querying," AVI '16, Jun. 7-10, 2016, Bari Italy, pp. 272-279.

Von Landesberger, Tatiana et al., "A System for Interactive Visual Analysis of Large Graphs Using Motifs in Graph Editing and Aggregation," VMV 2009, pp. 1-9.

Office Communication for U.S. Appl. No. 16/586,554 dated Jul. 24, 2020, pp. 1-27.

Office Communication for U.S. Appl. No. 16/586,554 dated Nov. 24, 2020, pp. 1-28.

Office Communication for U.S. Appl. No. 16/586,554 dated Feb. 16, 2021, pp. 1-7.

Office Communication for U.S. Appl. No. 16/586,554, dated Apr. 2, 2021, pp. 1-37.

* cited by examiner

PARENTING COMPUTED FIELDS WITH DATA OBJECTS

CROSS-REFERENCE TO RELATED APPLICATIONS

This application is a Utility Patent application based on previously filed U.S. Provisional Patent Application Ser. No. 62/944,977, filed on Dec. 6, 2019, the benefit of the filing date of which is hereby claimed under 35 U.S.C. § 119(e) and which is further incorporated in entirety by reference.

TECHNICAL FIELD

The present invention relates generally to data visualization, and more particularly, but not exclusively to, managing the display of objects included in the data visualization.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases, organizations employ various tools to generate visualizations of some or all of their data. Employing visualizations to represent this data may enable organizations to improve their understanding of critical business operations and help them monitor key performance indicators. However, in some cases, organizations may employ visualizations that may be based on fields directly provided by the underlying data as well as fields that may be computed by formulas that may take a variety of inputs. In some cases, the complexity of the data employed for generating visualizations may result in complex user interfaces. In some cases, naive arrangement of these user interfaces may result in user confusion or frustration. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
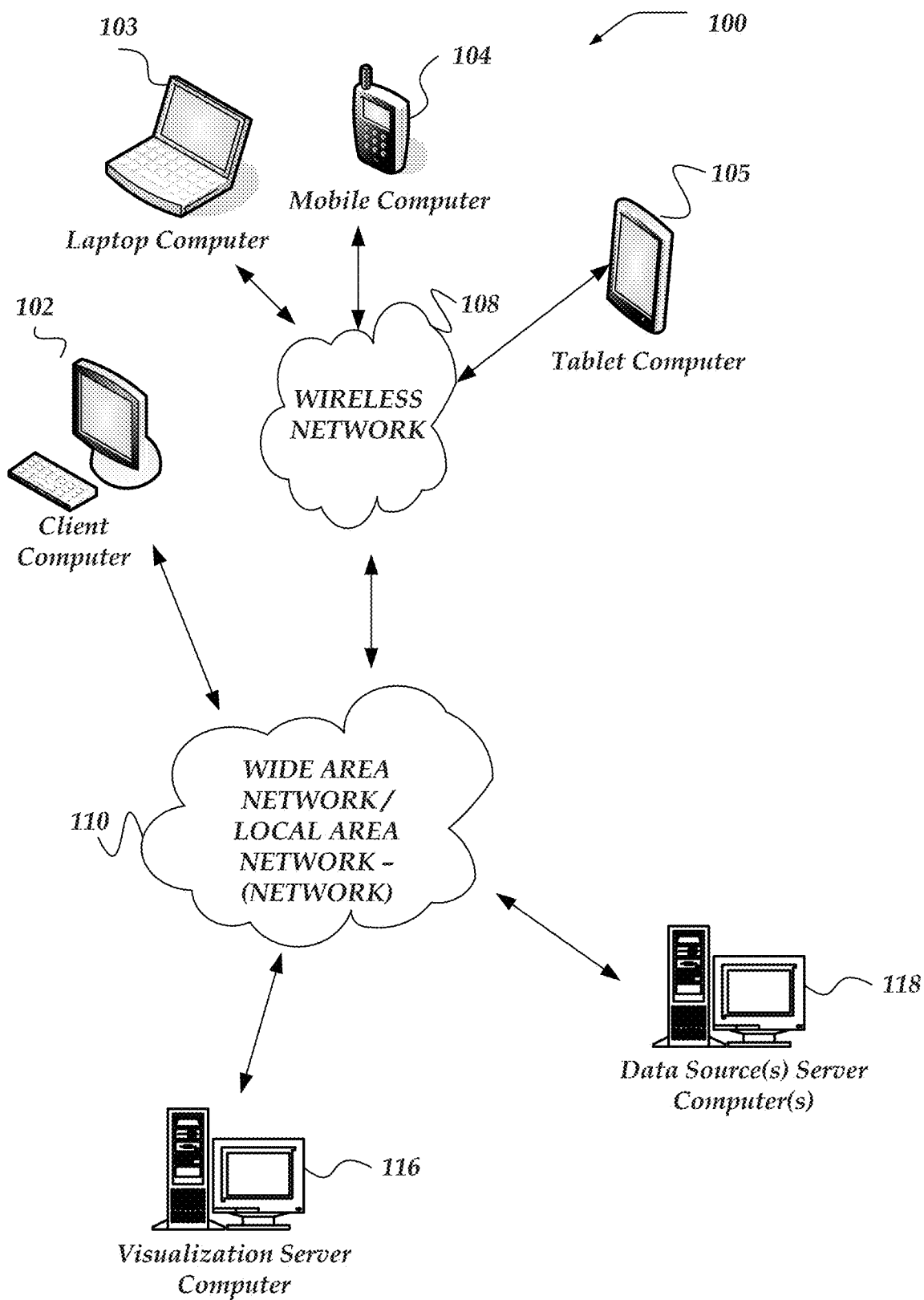
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, Rust, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "data source" refers to databases, applications, services, file systems, or the like, that store or provide information for an organization. Examples of data sources may include, RDBMS databases, graph databases, spreadsheets, file systems, document management systems, local or remote data streams, or the like. In some cases, data sources are organized around one or more tables or table-like structure. In other cases, data sources be organized as a graph or graph-like structure.

As used herein the term "data model" refers to one or more data structures that provide a representation of an underlying data source. In some cases, data models may provide views of a data source for particular applications. Data models may be considered views or interfaces to the underlying data source. In some cases, data models may map directly to a data source (e.g., practically a logical pass through). Also, in some cases, data models may be provided by a data source. In some circumstances, data models may be considered interfaces to data sources. Data models enable organizations to organize or present information from data sources in ways that may be more convenient, more meaningful (e.g, easier to reason about), safer, or the like.

As used herein the term "object model" refers a data model based on one or more data structures that may be comprised of one or more nodes and one or more edges to represent data objects and relationships between or among them. Nodes may be associated with one or more data objects and edges may be associated with one or more relationships between the data objects.

As used herein the term "data object" refers to one or more entities or data structures that comprise data models. In some cases, data objects may be considered portions of the data model. Data objects may represent individual instances of items or classes or kinds of items.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As user herein the "visualization model" refers to one or more data structures that represent one or more representations of a data model that may be suitable for use in a visualization that is displayed on one or more hardware displays. Visualization models may define styling or user interface features that may be made available to non-authoring user.

As used herein the term "display object" refers to one or more data structures that comprise visualization models. In some cases, display objects may be considered portions of the visualization model. Display objects may represent individual instances of items or entire classes or kinds of items that may be displayed in a visualization. In some embodiments, display objects may be considered or referred to as views because they provide a view of some portion of the data model.

As used herein the term "computed field" refers to one or more data structures that represent a computed field that may be used in visualizations or visualization models. Computed fields may include input fields that refer or reference other field in a data source, data object, constant values, user provided values, or the like, or combination thereof. For example, a field that represent the mean average of two input fields may be considered a computed field with two input fields.

As used herein the term "parentable" refers to circumstances or conditions where a computed field has been determined suitable for being assigned or associated with an object in an object model that may be considered the parent of the computed field.

As used herein the term "unparentable" refers to circumstances or conditions where a computed field has been determined unsuitable for being assigned or associated with an object in an object model that may be considered the parent of the computed field.

As used herein the term "configuration information" refers to information that may include rule based policies, pattern matching, scripts (e.g., computer readable instructions), or the like, that may be provided from various sources, including, configuration files, databases, user input, plugins, extensions, loadable libraries, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to visualizing data using one or more processors that execute one or more instructions to perform as described herein. In one or more of the various embodiments, a computed field that includes one or more input fields and an object model that includes a plurality of objects may be provided.

In one or more of the various embodiments, one or more of the plurality of objects may be determined based on the one or more input fields such that each input field corresponds to a determined object.

In one or more of the various embodiments, a sub-graph may be generated based on the one or more determined objects such that the one or more determined objects may be nodes of the sub-graph and relationships between two or more of the determined objects may be edges of the sub-graph.

In one or more of the various embodiments, zero or more determined objects may be iteratively pruned from the sub-graph based on a traversal of the sub-graph and one or more characteristics of the one or more determined objects such that each pruned object may be determined to be an attribute of at least one the one or more determined objects.

In one or more of the various embodiments, in response to the iterative pruning providing one remaining determined object in the sub-graph, assigning the remaining determined object as a parent of the computed field.

In one or more of the various embodiments, the computed field may be displayed in a user-interface based on the parent of the computed field.

In one or more of the various embodiments, in response to the iterative pruning providing two or more remaining determined objects in the sub-graph, determining that the computed field may be an unparentable computed field. In some embodiments, displaying the unparentable computed field in the user-interface.

In one or more of the various embodiments, the computed field may be determined to be an unparentable computed field based on one or more of the input fields being a constant value.

In one or more of the various embodiments, the computed field may be determined to an unparentable computed field based on a computation associated with the computed field being an aggregate function.

In one or more of the various embodiments, one or more attributes of the one or more determined objects may be determined based on a existence of a many-to-one relationship between two of the determined objects.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client computers 102-105, visualization server computer 116, data source server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, data source server computer 118, or other computers.

Client computers 102-105 may further be configured to include a client application that enables an end-user to log into an end-user account that may be managed by another computer, such as visualization server computer 116, data source server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116, data source server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, data source server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116, data source server computer 118 are described in more detail below in conjunction with FIG. 3. Although FIG. 1 illustrates visualization server computer 116, data source server computer 118, or the like, each as a single computer, the innovations or embodiments are not so limited. For example, one or more functions of visualization server computer 116, data source server computer 118, or the like, may be distributed across one or more distinct network computers. Moreover, in one or more embodiments, visualization server computer 116, data source server computer 118 may be implemented using a plurality of network computers. Further, in one or more of the various embodiments, visualization server computer 116, data source server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
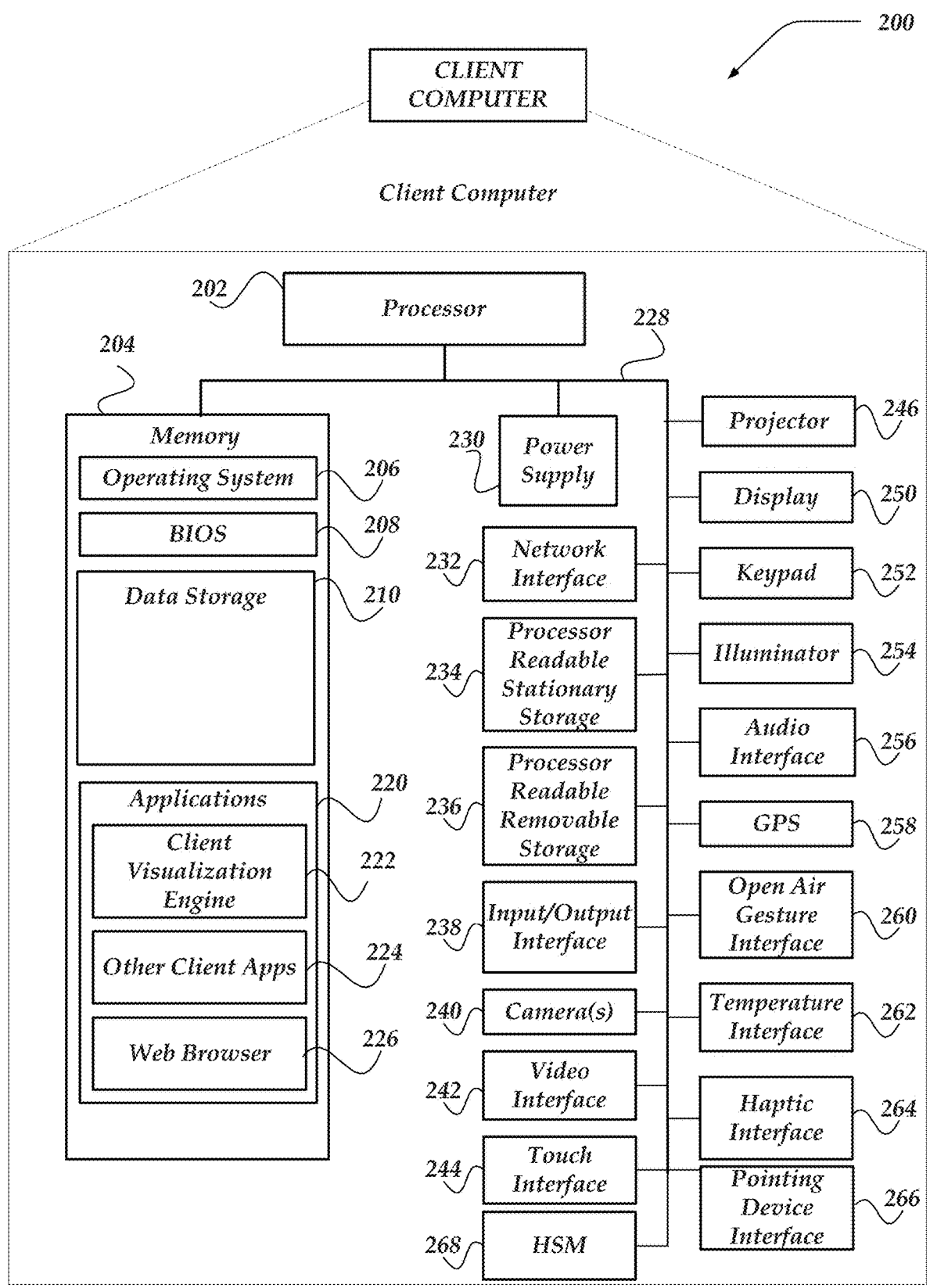
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, client visualization engine 222, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client visualization engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
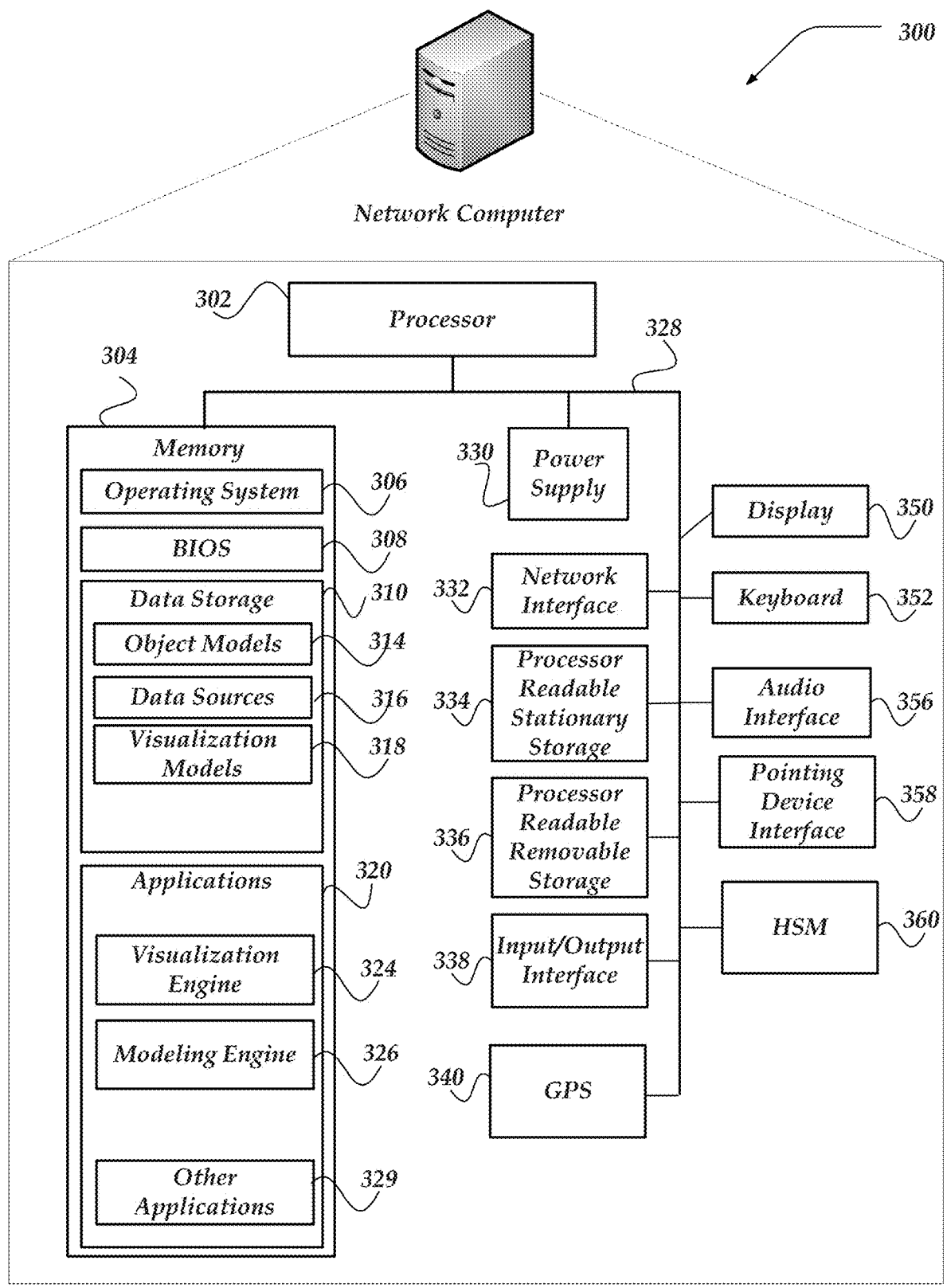
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of visualization server computer 116, data source server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, visualization engine 322, modeling engine 326, other applications 329, or the like, may be arranged to employ geo-location information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows (ID operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, object models 314, data sources 316, visualization models 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include visualization engine 324, modeling engine 326, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, visualization engine 324, modeling engine 326, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to visualization engine 324, modeling engine 326, other applications 329, or the like, may be provisioned and de-commissioned automatically.

Also, in one or more of the various embodiments, visualization engine 324, modeling engine 326, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
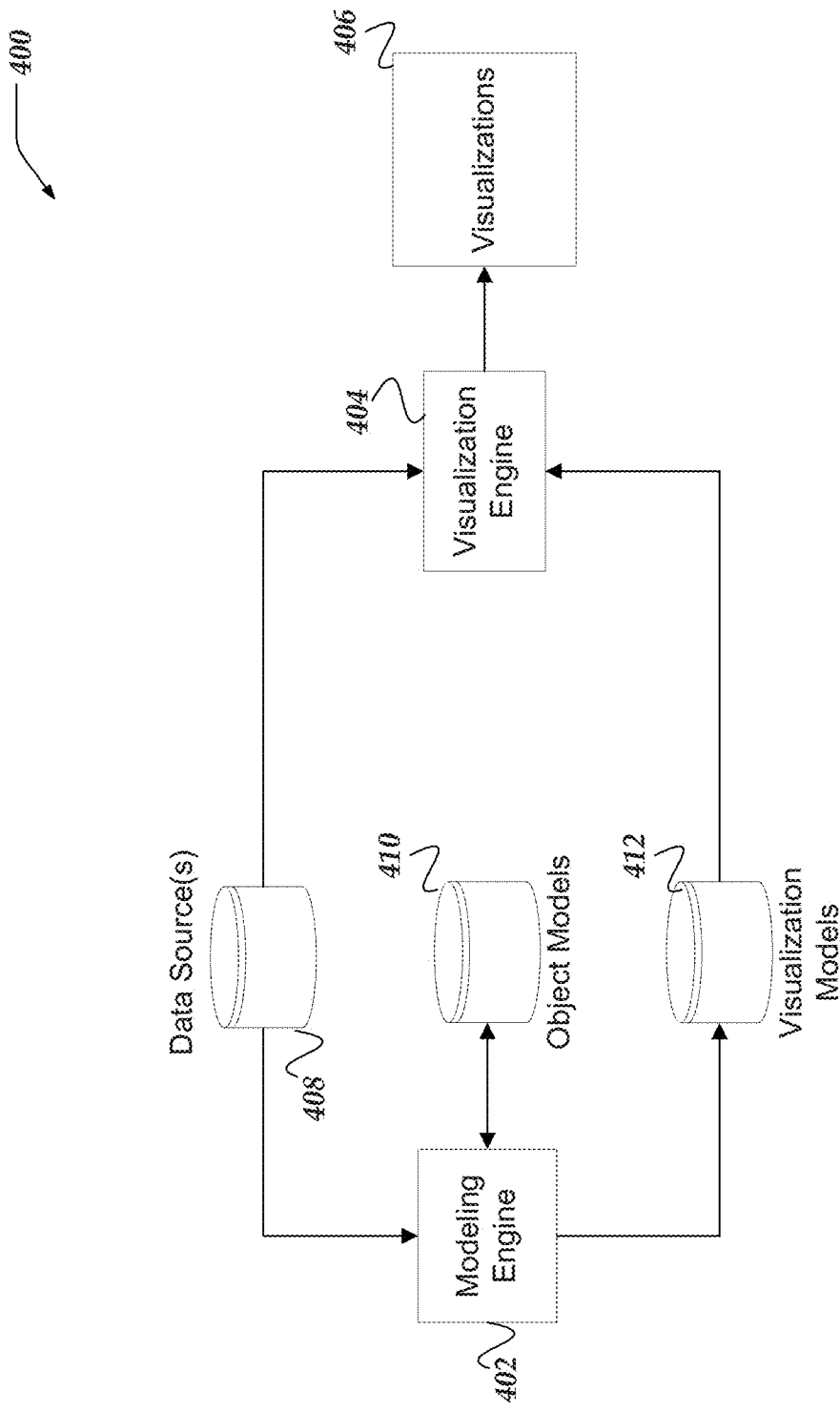
FIG. 4 illustrates a logical architecture of a system for parenting logical fields with data objects in accordance with one or more of the various embodiments.

FIG. 4 illustrates a logical architecture of system 400 for parenting computed fields with data objects in accordance with one or more of the various embodiments. In one or more of the various embodiments, system 400 may be comprised of various components, including, one or more modeling engines, such as, modeling engine 402; one or more visualization engines, such as, visualization engine 404; one or more visualizations, such as, visualization 406; one or more data sources, such as, data source 408; one or more object models, such as, object model 410 or one or more visualization models, such as, visualization model 412.

In one or more of the various embodiments, modeling engine 402 may be arranged to enable users to design one or more object models based on one or more data sources, such as, data source 408. Accordingly, in one or more of the various embodiments, modeling engine 402 may be arranged to enable users to design one or more visualization models based on the one or more object models. In some embodiments, the one or more visualization models may be provided to visualization engine 404. Accordingly, in one or more of the various embodiments, visualization engine 404 may be arranged to generate one or more visualizations based on the visualization models.

In one or more of the various embodiments, modeling engines may be arranged to access one or more data sources, such as, data source 410. In some embodiments, modeling engines may be arranged to include user interfaces that enable users to browse various data source information, data objects, or the like, to design object models or visualization models that may be used to generate visualizations based on information stored in the data sources. Accordingly, in some embodiments, visualization models may be designed to provide visualizations that include charts, plots, graphs, tables, graphics, one or more computed fields, styling, explanatory text, interactive elements, user interface features, or the like.

In some embodiments, users may be provided a graphical user interface that enables them to interactively design object models or visualization models such that various elements or display objects in the visualization model may be associated with data from one or more data sources, such as, data source 410. In one or more of the various embodiments, data sources, such as, data source 410 may include one or more of databases, data stores, file systems, or the like, that may be located locally or remotely. In some embodiments, data sources may be provided by another service over a network. In some embodiments, there may be one or more components (not shown) that filter or otherwise provide management views or administrative access to the data in a data source.

In one or more of the various embodiments, object models may be stored in one or more data stores, such as, object model storage 410. In this example, for some embodiments, object model storage 410 represents one or more databases, file systems, or the like, for storing, securing, or indexing object models.

In one or more of the various embodiments, visualization models may be stored in one or more data stores, such as, visualization model storage 412. In this example, for some embodiments, visualization model storage 412 represents one or more databases, file systems, or the like, for storing, securing, or indexing visualization models. In one or more of the various embodiments, visualization engines, such as, visualization engine 404 may be arranged to parse or otherwise interpret the visualization models, object models, and data from data sources to generate one or more visualizations that may be displayed to users.

Figure 5:
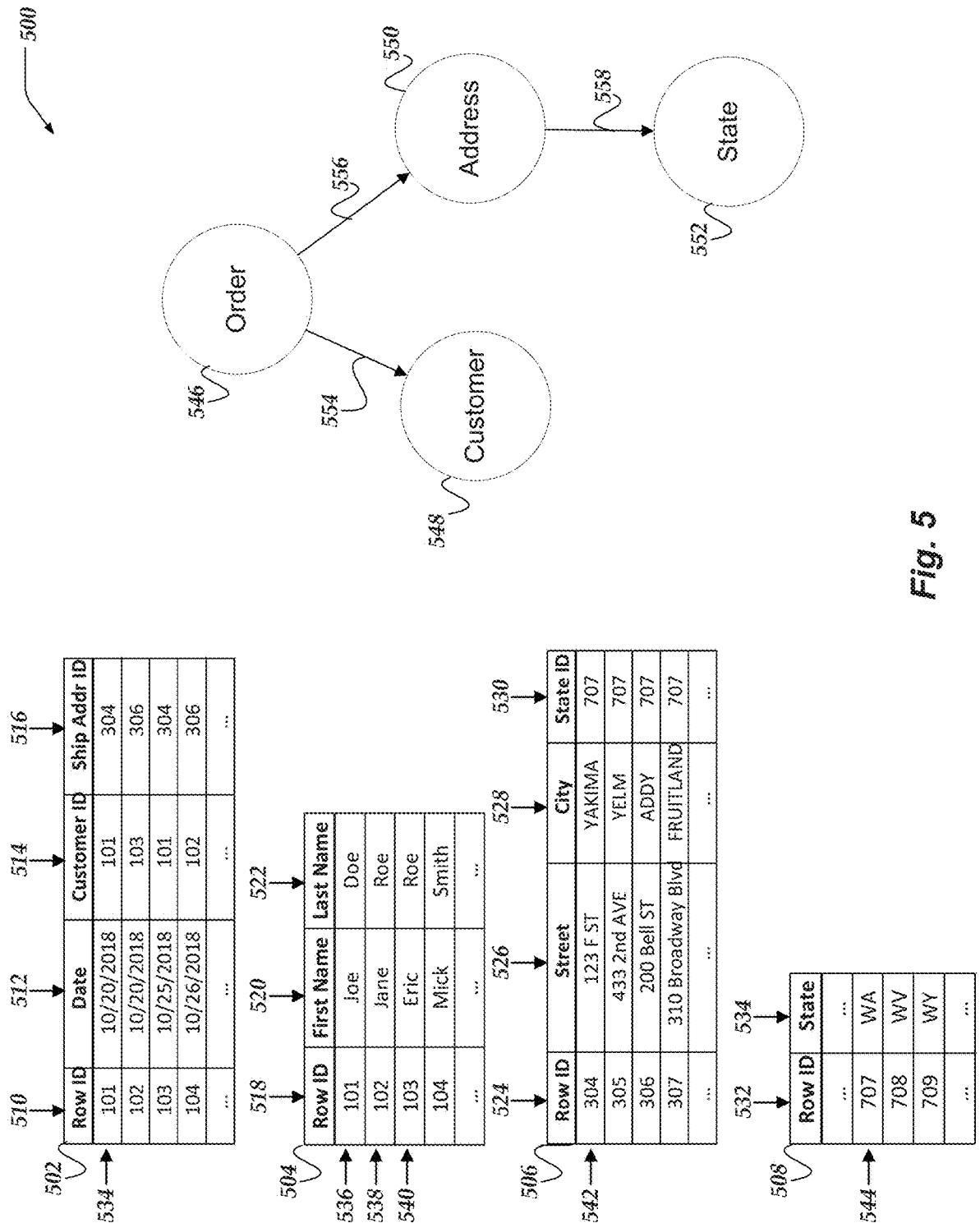
FIG. 5 illustrates a logical schematic of a portion of a system for parenting computed fields with data objects in accordance with one or more of the various embodiments.

FIG. 5 illustrates a logical schematic of a portion of system 500 for parenting computed fields with data objects in accordance with one or more of the various embodiments. In one or more of the various embodiments, data sources may include one or more data source objects, such as, tables, files, objects, classes, of the like. In one or more of the various embodiments, each data source object may include one or more items each associated with one or more fields. Accordingly, in some embodiments, each item in an data source object may represent an instance of an entity that may include values for some or all of the fields defined for the data source object.

In this example, system 500 includes a portion of data source objects that may be from one or more data sources. In this non-limiting example, the data source objects are represented as tables from a relational database (e.g., RDBMS). One of ordinary skill in the art will appreciate that production data sources may include many more data source objects from databases (e.g., SQL databases, graph databases, no-sql databases, or the like), remote data providers, service APIs, remote streams, files, or the like. However, in this example, for brevity and clarity, four simple data source objects are included. One of ordinary skill in the art will appreciate that this example is at least sufficient for disclosing the innovations included herein.

In one or more of the various embodiments, data sources may include one or more data source objects, such as, table 502, table 504, table 506, table 508, or the like. In this example, table 502 may represent orders; table 504, may represent customers; table 506 may represent addresses; and table 508 may represent States.

In this example, for some embodiments, table 502 may include various fields associated with orders. Accordingly, in this example, field 510 may represent row identifiers for order records; field 512 may represent the date of an order; field 514, may represent a customer identifier that references a customer associated with an order; field 516, may represent an identifier that references an address where the order may be delivered; or the like.

In this example, for some embodiments, table 504 may include various fields associated with customers. Accordingly, in this example, field 518 may represent row identifiers for customer records; field 520 may represent a first name of a customer; field 522, may represent a last name of a customer; or the like.

In this example, for some embodiments, table 506 may include various fields associated with addresses. Accordingly, in this example, field 524 may represent row identifiers for address records; field 526 may represent a street portion of an address; field 528, may represent a city of an address; field 530 may represent a state identifier that references a state associated with an address; or the like.

Also, in this example, for some embodiments, table 508 may include various fields associated with states. Accordingly, in this example, field 532 may represent row identifiers for state records; field 534 may represent the abbreviation for states; or the like.

In this example, a corresponding object model may include order object 546, customer object 548, address object 550, state object 552, or the like, which may be considered nodes in graph. Further, the relationships defined by the tables may be represented as edges, including edge 554, edge 556, edge 558, or the like.

In one or more of the various embodiments, individual fields in data source objects, such as, table 502-508 may reference of fields in other data source objects. In this example, order table 502 includes two fields that reference other tables, namely, customer table 504 and address table 506. Accordingly, in one or more of the various embodiments, these references result in edge 554 and edge 556.

For example, order record 534 has a row (or record) identifier of 101, a reference to a customer associated with customer identifier having a value of 101, and a reference to an address associated with address identifier having a value of 304.

Accordingly, in this example, order record 101 is for customer 101 known as Joe Doe and should be shipped to address 542, which in this example is 123 F ST, YAKIMA. Note, the address record 542 includes a reference to state 707 which corresponds to WA in states table 508.

In some cases, for some embodiments, data source objects or object model objects may be described in part based on cardinality relationships between objects, such as, one-to-one, many-to-one, one-to-many, many-to-many, or the like.

In this example, the relationship between orders and customers may be considered many-to-one, because more than one order instance may be associated with the same customer. Likewise, in this example, the relationship between orders and addresses may be considered many-to-one, because more than one order may ship to the same address.

Also, while not shown here, an example of a one-to-one relationship may include an employees object and an individual tax identifier object where each employee is associated with one and only one individual tax identifier and each individual tax identifier is associated with one and only one employee.

Also, while not shown here, an example of a many-to-many relationship may include a team object that may represent teams that may be associated with one or more employees in an organization where an employee may belong to more than one team at the same time.

Figure 6A:
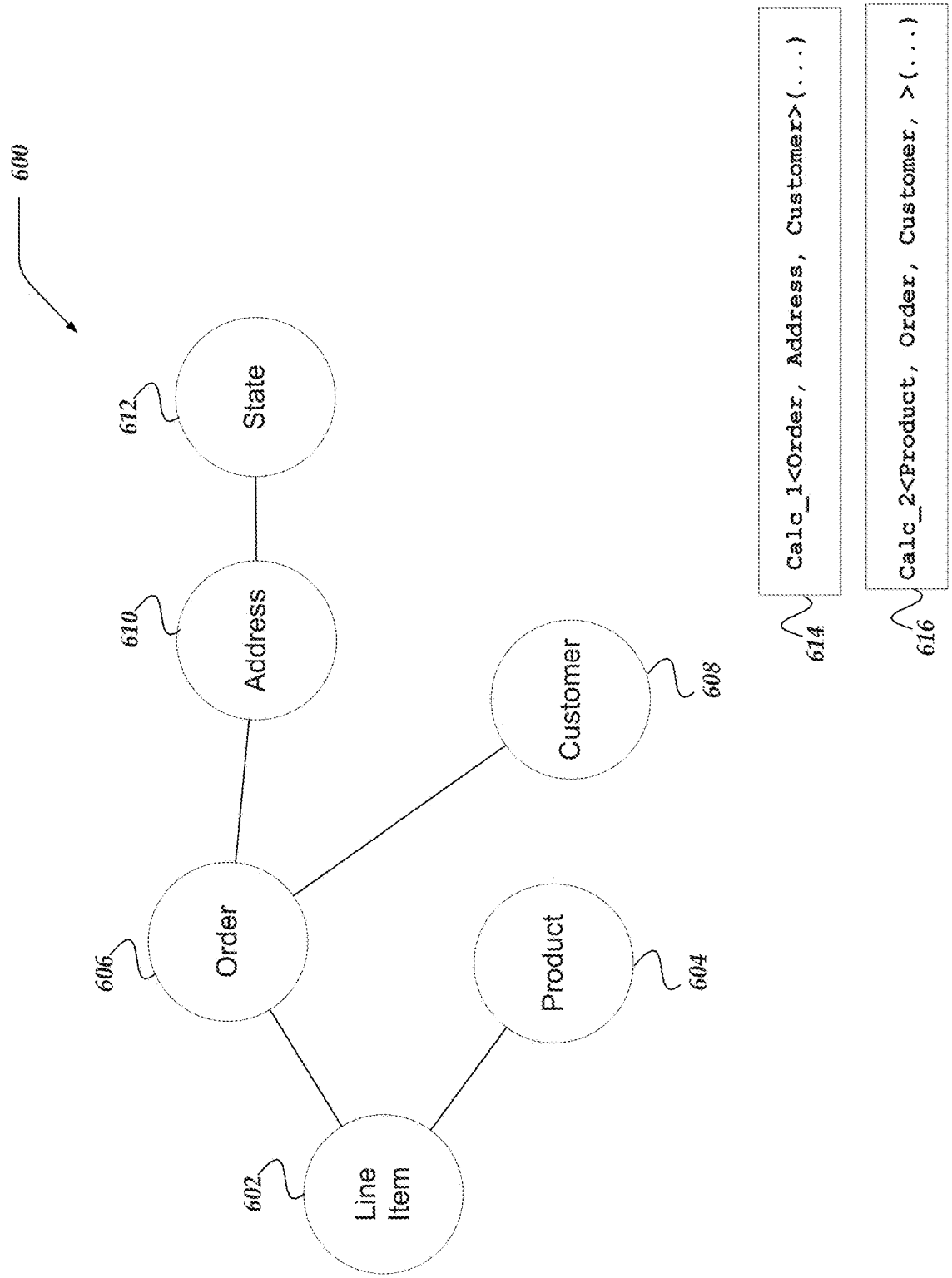
FIG. 6A illustrates a logical schematic of an object model for parenting computed fields with data objects in accordance with one or more of the various embodiments.

FIG. 6A illustrates a logical schematic of object model 600 for parenting computed fields with data objects in accordance with one or more of the various embodiments. As described above, in one or more of the various embodiments, object models may be provided based on one or more data sources.

Accordingly, in one or more of the various embodiments, users may employ object models to create one or more visualization models that may be rendered into visualizations by visualization engines. In some cases, object models may include one or more fields that include values calculated or computed rather than read directly from data in source. In some embodiments, fields that include values based one or more computations or functions may be referred to as computed fields. Whereas, fields based on data directly provided by a data source may be referred to as physical fields. Accordingly, in one or more of the various embodiments, visualization authors or designers may include one or more computed fields in the or more visualization models.

In this example, object model 600 includes various objects, including line item object 602, product object 604, order object 606, customer object 608, address object 610, state object 612, or the like. Further, in this example, the edges between the objects represent relationships between the objects that may be connected by a given edge.

Also, in this example, object model 600 includes two computed fields. In this example, computed field 614 computes a value based on inputs from order object 606, customer object 608, and address object 610. Likewise, in this example, object model 600 include computed field 616 that includes inputs from product object 616, order object 606, and customer object 608.

Figure 6B:
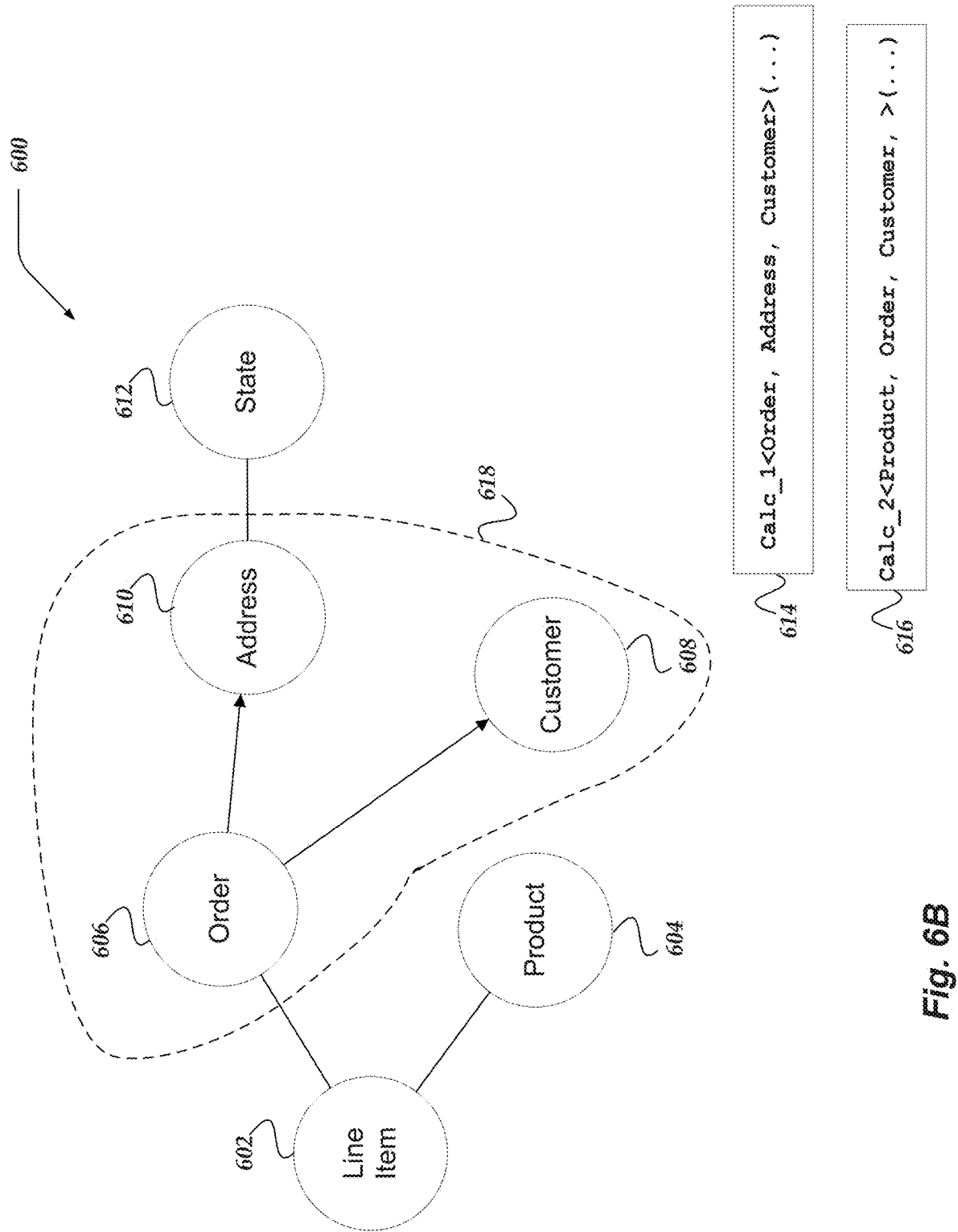
FIG. 6B illustrates a logical schematic of an object model for parenting computed fields with data objects in accordance with one or more of the various embodiments.

FIG. 6B illustrates a logical schematic of object model 600 for parenting computed fields with data objects in accordance with one or more of the various embodiments. In this example, a modeling engine may begin to automatically perform one or more actions to determine which objects should be assigned as the parent of computed field 614.

As discussed above, computed field 614 includes inputs associated with order object 606, customer object 608, and address object 610. Accordingly, in this example, sub-graph 618 may be determined from the objects in object model 600.

If a computed field is being considered for parenting, in one or more of the various embodiments, a modeling engine may be arranged to determine a minimum sub-graph in the object model that includes each object that contributes input values to the computed field under consideration. For example, in some embodiments, a modeling engine may be arranged to traverse an object model to determine the minimum set of objects that comprise a sub-graph, such as, sub-graph 618. In some embodiments, because each input parameter of an eligible computed field may be associated with one object in the object model, the set of object models comprising the relevant sub-graph may be determined based on the input parameters to a computed field.

Figure 6C:
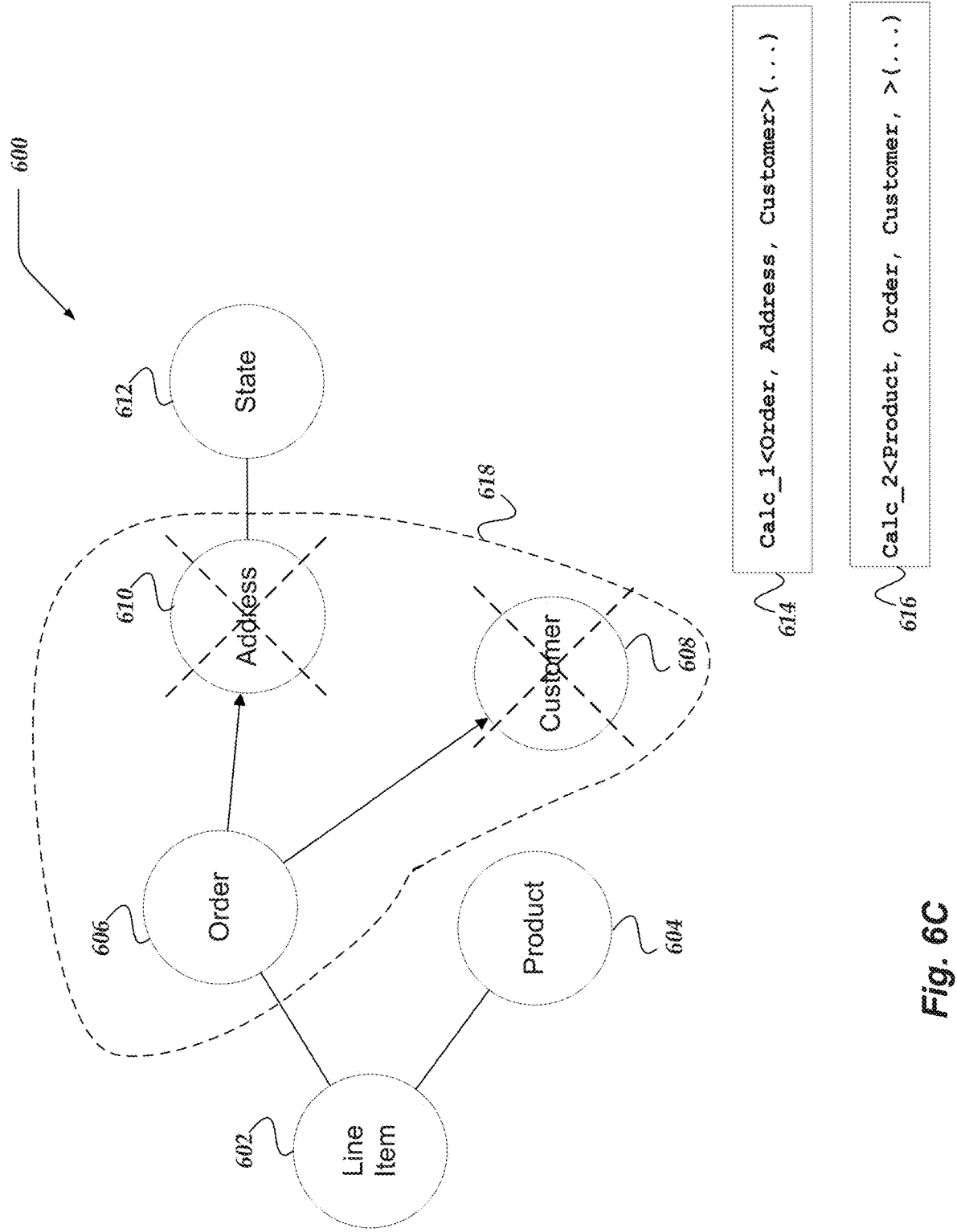
FIG. 6C illustrates a logical schematic of an object model for parenting computed fields with data objects in accordance with one or more of the various embodiments.

FIG. 6C illustrates a logical schematic of object model 600 for parenting computed fields with data objects in accordance with one or more of the various embodiments. In this example, the modeling engine has determined minimum sub-graphs and has executed one or more actions to perform recursive pruning of the objects in the sub-graphs associated with computed field 614.

Accordingly, in one or more of the various embodiments, modeling engine may be arranged to prune one or more objects from s sub-graph, such as, sub-graph 618 by eliminating objects that may be considered attributes of other objects. Accordingly, in one or more of the various embodiments, objects that have many-to-one relationships with other objects may be considered for pruning. In this example, each order may have one shipping address though many orders may have the same shipping address. Accordingly, in this example, address object 610 may be considered an attribute of order object 606. Thus, in this example, for some embodiments, address object 610 may be automatically pruned from sub-graph 618. Similarly, in this example, for some embodiments, customer object 608 may be pruned from sub-graph 618.

In one or more of the various embodiments, if at the completion of the attribute pruning there remains one object, the modeling engine may be arranged to determine that the remaining object may be the parent of the computed field. In this example, because order object 606 may be the lone remaining object, order object 606 may be assigned as the parent of computed field 614.

Figure 6D:
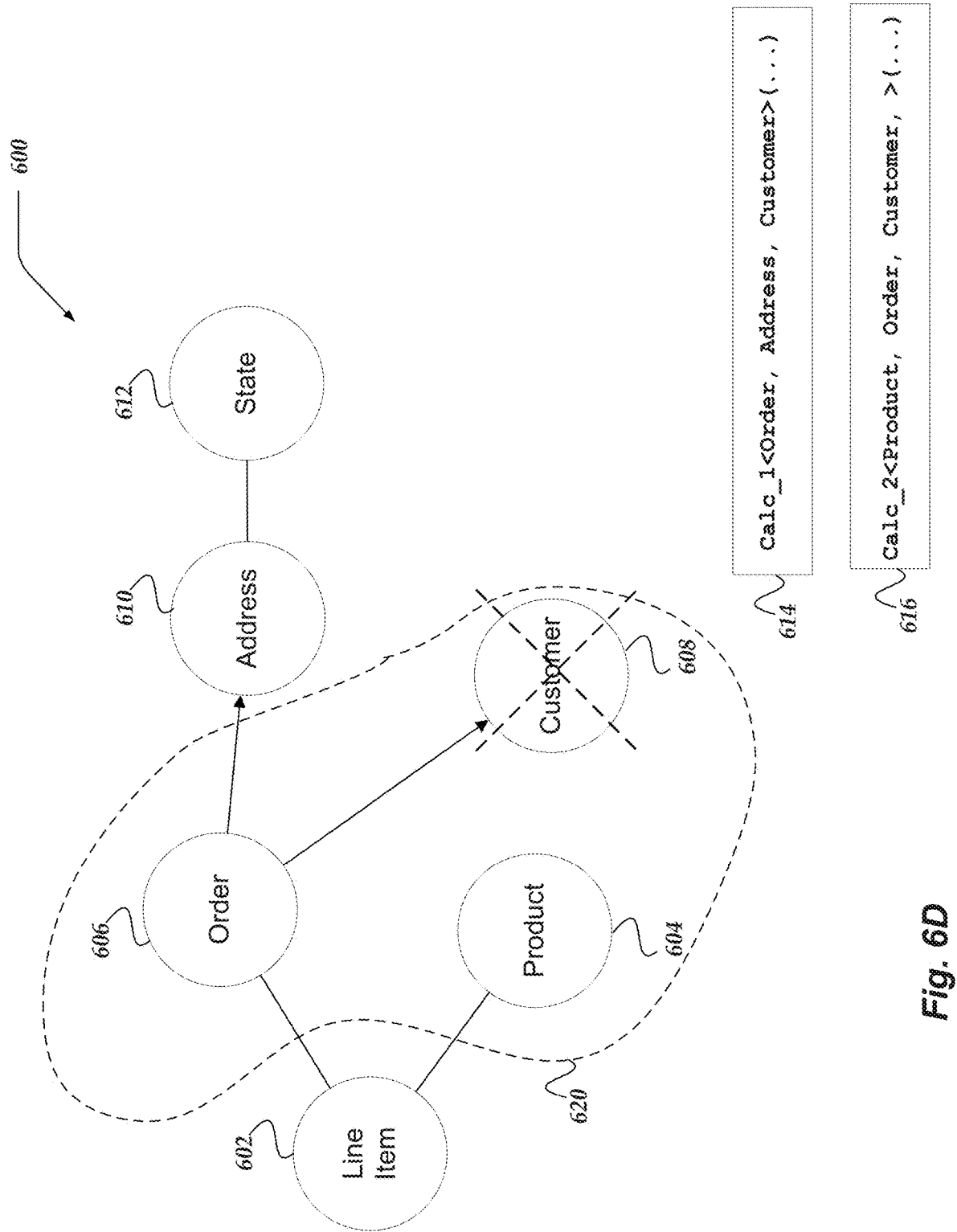
FIG. 6D illustrates a logical schematic of an object model for parenting computed fields with data objects in accordance with one or more of the various embodiments.

FIG. 6D illustrates a logical schematic of object model 600 for parenting computed fields with data objects in accordance with one or more of the various embodiments. In this example, the modeling engine has determined minimum sub-graphs and has perform recursive pruning of the objects in the sub-graph associated with computed field 616. In this example, sub-graph 620 may be determined based on the input fields of computed field 616. Accordingly, in one or more of the various embodiments, before pruning, sub-graph 620 includes, product object 604, order object 606, and customer object 608. In one or more of the various embodiments, pruning may eliminate customer object 608 from consideration. However, in contrast to sub-graph 618 (in FIGS. 6B and 6C), after pruning has been completed, two objects remain in sub-graph 620 rather than one object. Thus, in this example, for some embodiments, computed field 616 may be determined to remain parented because a definitive parent object has not been determined.

Figure 7:
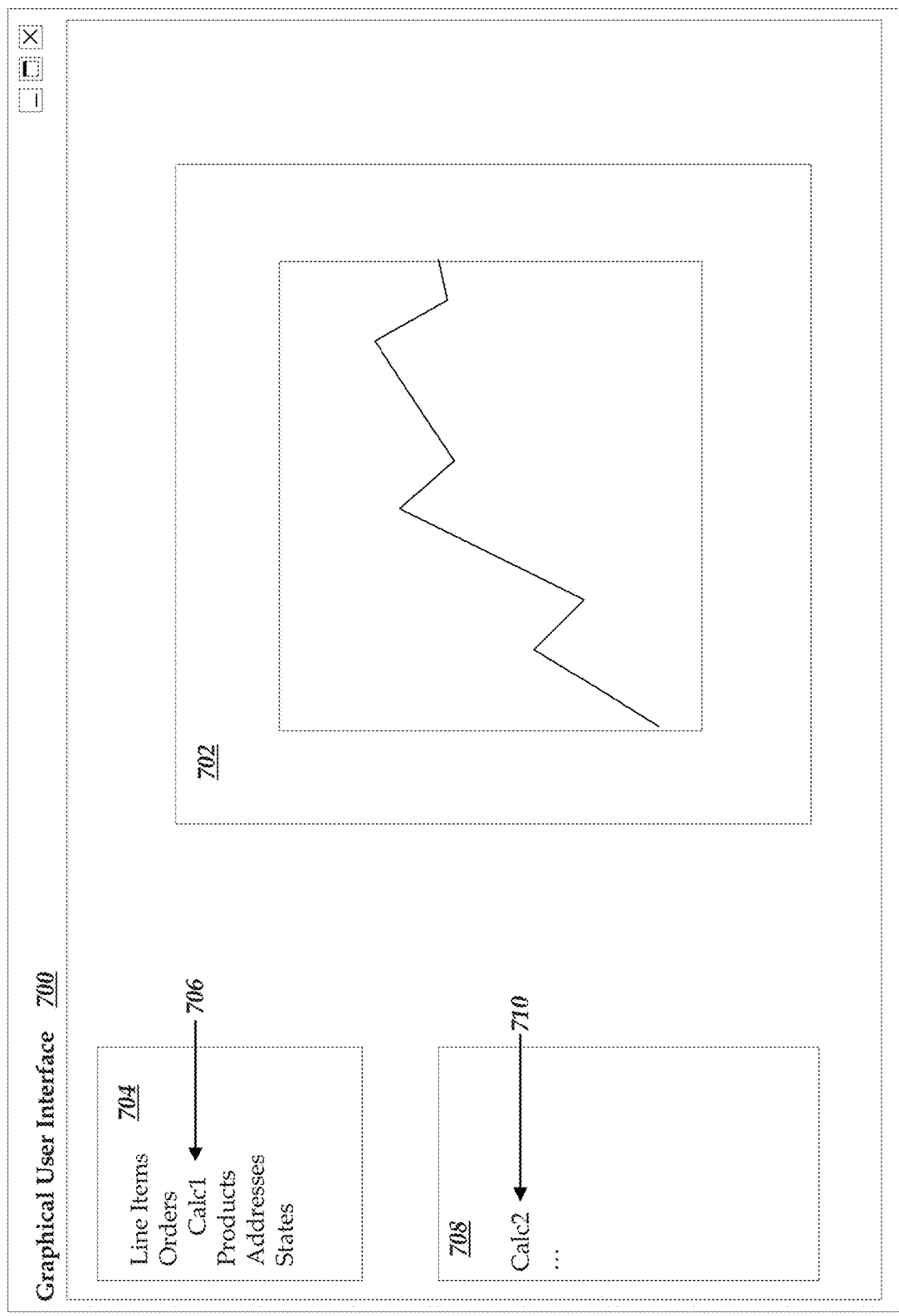
FIG. 7 illustrates a portion of a user interface for parenting computed fields with data objects in accordance with one or more of the various embodiments.

FIG. 7 illustrates a portion of user interface 700 for parenting computed fields with data objects in accordance with one or more of the various embodiments. In one or more of the various embodiments, user interfaces, such as, user interface 700 may include one or more visualizations, such as, visualization 702. Further, in some embodiments, one or more additional features, or properties determined in part from the object model that provides the basis for the visualization may be included in a user interface, such as, user interface 700.

In this example, panel 704 includes a list of labels associated with objects in the object model associated with the visualization. In this example, the list may be considered to represent the objects in object model 600. Accordingly, in this example, for some embodiments, labels for Line Items, Orders, Products, Addresses, States, or the like, may be included in panel 704.

Also, in some embodiments, one or more panels, such as, panel 704, may be arranged to show one or more parented computed fields, such as, computed field 614 as being associated with their assigned parent. In this example, panel 704 includes label 706 that displays a label for computed field 614. In some embodiments, user interfaces, such as, user interface 700 may be arranged to employ one or more user interface styles or features to indicate which computed fields may have parent objects. Accordingly, in this example, the indentation of label 706 with respect to the object labels may be considered to indicate that the order object may be the parent of a computed field labeled Calci (e.g., computed field 614).

As discussed above, in some cases, computed fields may be considered to be unparented. Accordingly, in some embodiments, various user interface features or styles may be employed to indicate that one or more computed fields may not have parents. In this example, panel 708 may be considered to display an interactive list of labels associated with unparented computed fields. Accordingly, in this example, label 710 may be considered to identify an unparented computed field, such as, computed field 616.

Generalized Operations

Figure 8:
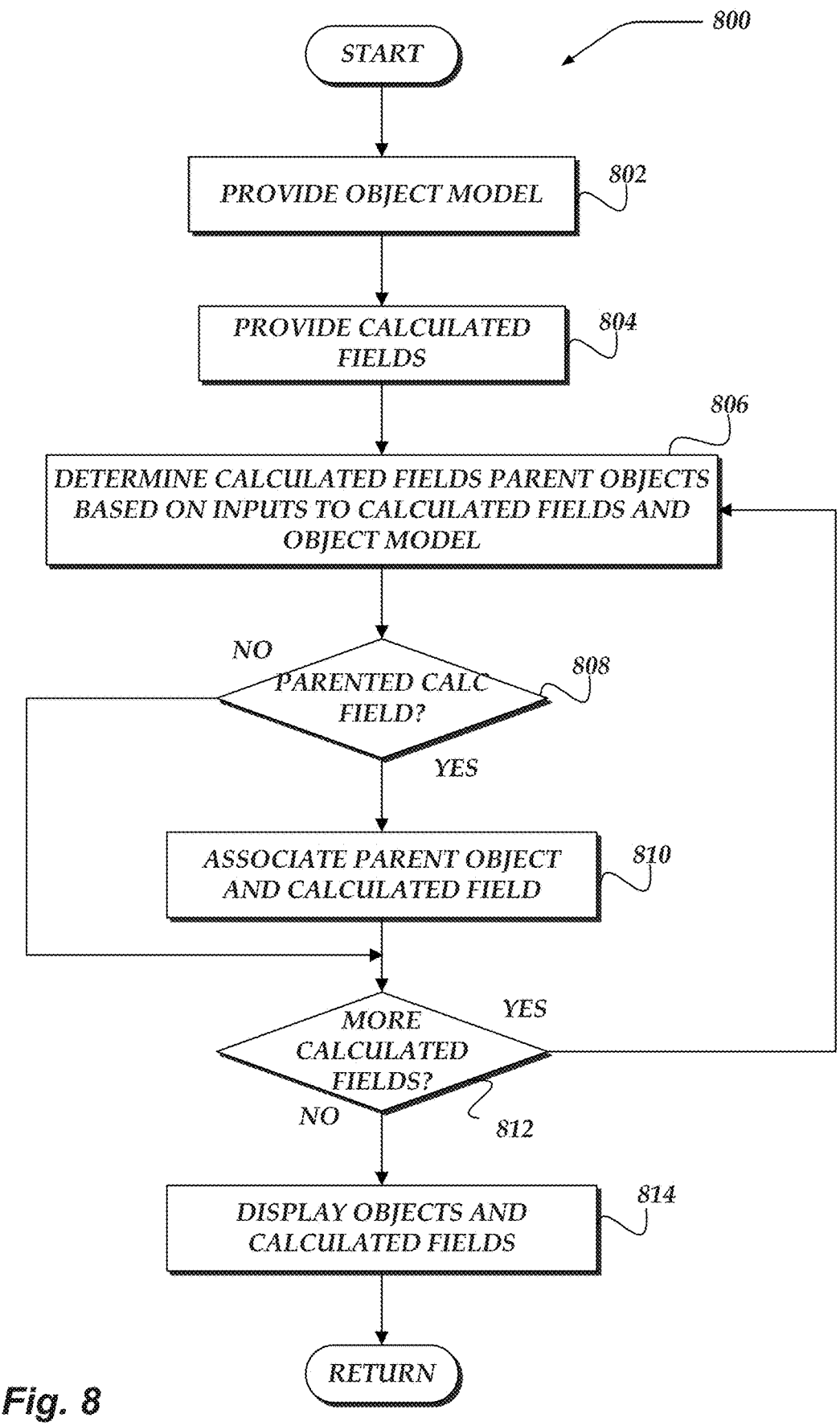
FIG. 8 illustrates an overview flowchart for a process for parenting logical fields with data objects in accordance with one or more of the various embodiments.
Figure 9:
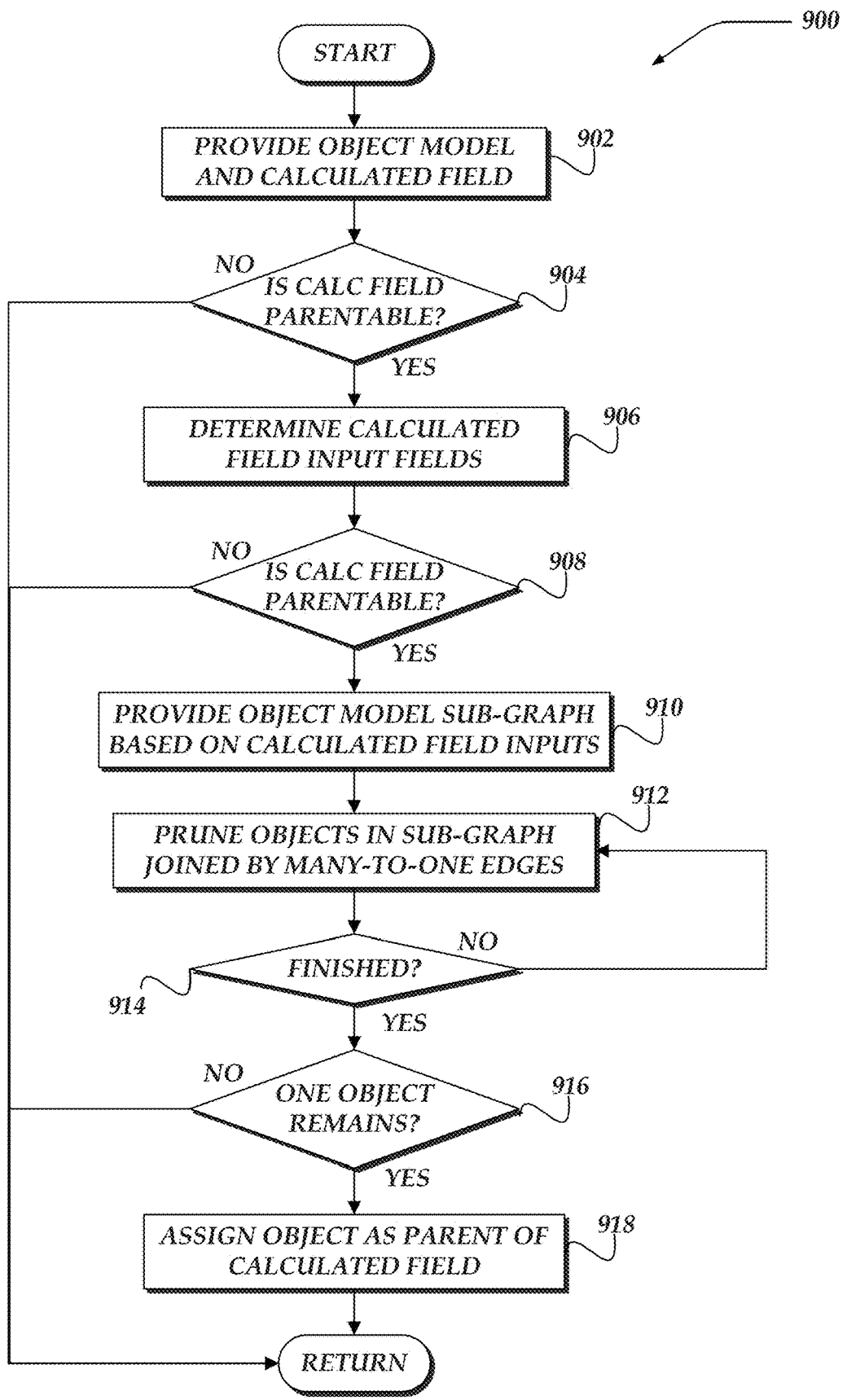
FIG. 9 illustrates a flowchart for a process for parenting logical fields with data objects in accordance with one or more of the various embodiments.

FIGS. 8-9 represent generalized operations for parenting computed fields with data objects in accordance with one or more of the various embodiments. In one or more of the various embodiments, processes 800 or 900 described in conjunction with FIGS. 8-9 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 8-9 may be used for parenting computed fields with data objects in accordance with at least one of the various embodiments or architectures such as those described in conjunction with FIGS. 4-7.

Further, in one or more of the various embodiments, some or all of the actions performed by processes 800, or 900 may be executed in part by visualization engine 324 or modeling engine 326 executing on one or more processors of one or more network computers.

FIG. 8 illustrates an overview flowchart for process 800 for parenting logical fields with data objects in accordance with one or more of the various embodiments. After a start block, at block 802, in one or more of the various embodiments, an object model may be provided to modeling engine. As described above, object models may be designed based on one or more data sources or data models.

At block 804, in one or more of the various embodiments, one or more computed fields may be provided. As described above, in some embodiments, visualization authors may be enabled to define various computed fields based on fields values, constants, built-in functions, customer functions, or the like. In one or more of the various embodiments, each computed fields may be arranged to accepted one or more input values that may correspond to fields of objects included in the provided object model.

At block 806, in one or more of the various embodiments, the modeling engine may be arranged to determine one or more parent objects for some or none of the computed fields based the inputs to each computed field and the object model.

At decision block 808, in one or more of the various embodiments, if a computed field may be parented with an object, control may flow to block 810; otherwise, control may flow to decision block 812.

At block 810, in one or more of the various embodiments, the modeling engine may be arranged to associate an object with the computed field as its parent object.

At decision block 812, in one or more of the various embodiments, if more computed fields remain to be considered for parenting, control may loop back to block 806; otherwise, control may flow to block 814.

At block 814, in one or more of the various embodiments, a visualization engine may be arranged to display information associated with one or more objects and one or more of the computed fields.

Next, in one or more of the various embodiments, control may be returned to a calling process.

FIG. 9 illustrates a flowchart for process 900 for parenting logical fields with data objects in accordance with one or more of the various embodiments. After a start block, at block 902, in one or more of the various embodiments, an object model and a computed field may be provided to a modeling engine. As described above, visualization authors, model templates, modeling engine configurations, or the like, may associate one or more computed fields with an object model. Accordingly, in one or more of the various embodiments, the modeling engine or a visualization engine may be arranged to perform actions to determine if one or more of the computed fields may be parented with an object in the object model. Thus, in some embodiments, the computed fields associated with an object model may be evaluated to determine if they may be eligible for being associated with a parent.

In one or more of the various embodiments, modeling engines may be arranged to evaluate each computed field based on one or more pre-conditions that may determine if a given computed field may be suitable for being associated with parent object.

Accordingly, in one or more of the various embodiments, computed fields that represent aggregate calculations may be immediately excluded from consideration. In some embodiments, modeling engines may be arranged to execute various actions to determine if a computed field may be an aggregated calculation. In some embodiments, computed fields may be associated with meta-data that expressly indicates if calculations associated with a computed field may be aggregating calculations. For example, in some embodiments, computed fields may be associated with flags or tags that indicate if calculations associated with the computed field are aggregate calculations. Also, for example, in some embodiments, modeling engines, or the like, may employ lookup tables, pattern matching, or the like, that may be employed to determine if a computed field may include one or more aggregate calculations. For example, in some embodiments, if the computed field is a built-in function named SUM, the modeling engine may be arranged to determine that it is an aggregate calculation by confirming the function SUM is in a lookup table that includes the names of aggregate calculations. Likewise, in some embodiments, if the computed field may include customized functions, the author of the function may be enabled to mark the associated computed fields as including aggregates.

At decision block 904, in one or more of the various embodiments, if the computed field may be suitable for associating with a parent object, control may flow to block 906; otherwise, control may be returned to a calling process.

At block 906, in one or more of the various embodiments, the modeling engine may be arranged to determine one or more input fields of the computed field. As described above, in some embodiments, computed fields may include one or more input fields that may correspond to fields of object models.

At decision block 908, in one or more of the various embodiments, if the computed field remains suitable for associating with a parent object, control may flow to block 910; otherwise, control may be returned to a calling process.

Accordingly, in some embodiments, the modeling engine may be arranged to iterate over the set of input fields of the computed field to determine if the computed field remains parentable. In some embodiments, if one or more of the input fields are constants, the computed field may be deemed unparentable.

In one or more of the various embodiments, modeling engine may be arranged to employ additional information, including lookup tables, lists, pattern matching, or the like, provided via configuration information to determine if the computed fields associated with a computed field may render that computed field unparentable. Thus, in some embodiments, modeling engines may be arranged to adapt to local circumstances without otherwise departing from the scope of the innovations disclosed herein. For example, in some embodiments, a visualization author or an organization may be enabled to mark one or more computed fields as unparentable to adapt to local circumstances.

At block 910, in one or more of the various embodiments, the modeling engine may be arranged to provide a sub-graph of the object model based on the input fields of the computed field and the object model. In one or more of the various embodiments, modeling engines may be arranged to determine which objects in the object model may be associated with the input fields of the computed field.

In some embodiments, the input fields may be associated with meta-data, such as, index values, labels, paths, URIs, or the like, that may be employed to determine the object that may be associated with a given input field. In some embodiments, the information may be employed for determining the relationship between an input field and an object may be hidden or otherwise not displayed to a user. Alternatively, in some embodiments, the information for associating an input field with an object may be fully or partially visible to a user. For example, an input field that may be labeled as Customer.FirstName may indicate that the object is Customer and the field is FirstName, or the like.

Accordingly, in one or more of the various embodiments, modeling engines may be arranged to assemble a sub-graph of objects based on the object that may be associated with the input fields of the computed field. In some embodiments, this collection of objects may be referred to as a sub-graph because the relationships between the objects may be preserved for subsequent analysis.

At block 912, in one or more of the various embodiments, the modeling engine may be arranged to prune zero or more objects from the sub-graph based on relationships between the one or more objects associated with the sub-graph. In one or more of the various embodiments, modeling engines may be arranged to determine objects in the sub-graph that may be related based on many-to-one relationships. Accordingly, in one or more of the various embodiments, each object that may be an attribute of another object may be removed from the sub-graph. For example, in one or more of the various embodiments, Order objects may reference Address object that represent the shipping address for another. Accordingly, in this example, the shipping address represented by Address objects may be considered an attribute or feature of the Order object.

In one or more of the various embodiments, modeling engines may iteratively visit each object in the sub-graph to determine if the visited object should be pruned from the sub-graph.

At decision block 914, in one or more of the various embodiments, if pruning of the sub-graph is finished, control may flow to decision block 916; otherwise, control may loop back to block 912. In one or more of the various embodiments, modeling engines may be arranged to continuing the pruning actions until all the objects have visited. In some embodiments, modeling engines may be arranged to improve performance by limiting the traversal of the sub-graph to objects that may have many-to-one relationships with one or more other objects in the sub-graph.

At decision block 916, in one or more of the various embodiments, if one object remains in the sub-graph, control may flow to block 918; otherwise, control may be returned to a calling process. In some embodiments, if all objects or relationships in the sub-graph have been visited, there may be two or more object remaining in the sub-graph. Accordingly. in some embodiments, modeling engines may be arranged to determine that the associated computed field as unparentable. For example, for some embodiments, if there are two objects remaining after the pruning, parenting the computed field under either or both of the objects may be confusing to users because neither object is likely to fit the semantics of being of parent of the computed field. Thus, in some embodiments, such objects may be considered unparentable and remain unparented.

At block 918, in one or more of the various embodiments, the modeling engine may be arranged to assign the remaining object as the parent of the computed field.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for visualizing data using a computer that includes one or more processors, wherein the method is executed by the one or more processors that perform actions, comprising:
   providing a computed field that includes one or more input fields and an object model that includes a plurality of objects;
   determining one or more of the plurality of objects based on the one or more input fields, wherein each input field corresponds to a determined object;
   generating a sub-graph based on the one or more determined objects, wherein the one or more determined objects are nodes of the sub-graph and relationships between two or more of the determined objects are edges of the sub-graph;
   iteratively pruning zero or more determined objects from the sub-graph based on a traversal of the sub-graph and one or more characteristics of the one or more determined objects, wherein each pruned object is determined to be an attribute of at least one the one or more determined objects;
   in response to the iterative pruning providing one remaining determined object in the sub-graph, assigning the one remaining determined object as a parent of the computed field, wherein the computed field is an unparentable computed field when the iterative pruning provides two or more remaining determined objects in the subgraph; and
   displaying the computed field in a user-interface based on the parent of the computed field.

2. The method of claim 1, further comprising, determining the computed field is an unparentable computed field based on one or more of the input fields being a constant value.

3. The method of claim 1, further comprising, determining the computed field is an unparentable computed field based on a computation associated with the computed field being an aggregate function.

4. The method of claim 1, further comprising, determining one or more attributes of the one or more determined objects based on a determination of a many-to-one relationship between two of the determined objects.

5. A processor readable non-transitory storage media that includes instructions for visualizing data, wherein execution of the instructions by one or more processors, performs actions, comprising:
providing a computed field that includes one or more input fields and an object model that includes a plurality of objects;
determining one or more of the plurality of objects based on the one or more input fields, wherein each input field corresponds to a determined object;
generating a sub-graph based on the one or more determined objects, wherein the one or more determined objects are nodes of the sub-graph and relationships between two or more of the determined objects are edges of the sub-graph;
iteratively pruning zero or more determined objects from the sub-graph based on a traversal of the sub-graph and one or more characteristics of the one or more determined objects, wherein each pruned object is determined to be an attribute of at least one the one or more determined objects;
in response to the iterative pruning providing one remaining determined object in the sub-graph, assigning the one remaining determined object as a parent of the computed field, wherein the computed field is an unparentable computed field when the iterative pruning provides two or more remaining determined objects in the subgraph; and
displaying the computed field in a user-interface based on the parent of the computed field.

6. The media of claim 5, further comprising, determining the computed field is an unparentable computed field based on one or more of the input fields being a constant value.

7. The media of claim 5, further comprising, determining the computed field is an unparentable computed field based on a computation associated with the computed field being an aggregate function.

8. The media of claim 5, further comprising, determining one or more attributes of the one or more determined objects based on a determination of a many-to-one relationship between two of the determined objects.

9. A system for visualizing data over a network, comprising:
a network computer, comprising:
a memory that stores at least instructions; and
one or more processors that execute instructions that perform actions, including:
providing a computed field that includes one or more input fields and an object model that includes a plurality of objects;
determining one or more of the plurality of objects based on the one or more input fields, wherein each input field corresponds to a determined object;
generating a sub-graph based on the one or more determined objects, wherein the one or more determined objects are nodes of the sub-graph and relationships between two or more of the determined objects are edges of the sub-graph;
iteratively pruning zero or more determined objects from the sub-graph based on a traversal of the sub-graph and one or more characteristics of the one or more determined objects, wherein each pruned object is determined to be an attribute of at least one the one or more determined objects;
in response to the iterative pruning providing one remaining determined object in the sub-graph, assigning the one remaining determined object as a parent of the computed field, wherein the computed field is an unparentable computed field when the iterative pruning provides two or more remaining determined objects in the subgraph; and
a client computer, comprising:
a memory that stores at least instructions; and
one or more processors that execute instructions that perform actions, including:
displaying the computed field in a user-interface based on the parent of the computed field.

10. The system of claim 9, wherein the one or more processors of the network computer execute instructions that perform actions, further comprising, determining the computed field is an unparentable computed field based on one or more of the input fields being a constant value.

11. The system of claim 9, wherein the one or more processors of the network computer execute instructions that perform actions, further comprising, determining the computed field is an unparentable computed field based on a computation associated with the computed field being an aggregate function.

12. The system of claim 9, wherein the one or more processors of the network computer execute instructions that perform actions, further comprising, determining one or more attributes of the one or more determined objects based on a determination of a many-to-one relationship between two of the determined objects.

13. A network computer for visualizing data over a network, comprising:
a memory that stores at least instructions; and
one or more processors that execute instructions that perform actions, including:
providing a computed field that includes one or more input fields and an object model that includes a plurality of objects;
determining one or more of the plurality of objects based on the one or more input fields, wherein each input field corresponds to a determined object;
generating a sub-graph based on the one or more determined objects, wherein the one or more determined objects are nodes of the sub-graph and relationships between two or more of the determined objects are edges of the sub-graph;
iteratively pruning zero or more determined objects from the sub-graph based on a traversal of the sub-graph and one or more characteristics of the one or more determined objects, wherein each pruned object is determined to be an attribute of at least one the one or more determined objects;
in response to the iterative pruning providing one remaining determined object in the sub-graph, assigning the one remaining determined object as a parent of the computed field, wherein the computed field is an unparentable computed field when the iterative pruning provides two or more remaining determined objects in the subgraph; and
displaying the computed field in a user-interface based on the parent of the computed field.

14. The network computer of claim 13, wherein the one or more processors execute instructions that perform actions, further comprising, determining the computed field is an unparentable computed field based on one or more of the input fields being a constant value.

15. The network computer of claim 13, wherein the one or more processors execute instructions that perform actions, further comprising, determining the computed field is an unparentable computed field based on a computation associated with the computed field being an aggregate function.

16. The network computer of claim 13, wherein the one or more processors execute instructions that perform actions, further comprising, determining one or more attributes of the one or more determined objects based on a determination of a many-to-one relationship between two of the determined objects.

* * * * *